US009027411B2

(12) United States Patent
Ishii et al.

(10) Patent No.: US 9,027,411 B2
(45) Date of Patent: May 12, 2015

(54) STRESS AND STRAIN SENSING DEVICE

(75) Inventors: Hiroshi Ishii, Mizunami (JP); Yasuhiro Asai, Mizunami (JP); Hideo Sugaya, Shinagawa-ku (JP)

(73) Assignees: Public Interest Incorporated Foundations Association for the Development of Earthquake Prediction, Tokyo (JP); Techno Sugaya Co., Ltd., Tokyo (JP)

( * ) Notice: Subject to any disclaimer, the term of this patent is extended or adjusted under 35 U.S.C. 154(b) by 266 days.

(21) Appl. No.: 13/641,093

(22) PCT Filed: Apr. 3, 2012

(86) PCT No.: PCT/JP2012/059115
§ 371 (c)(1),
(2), (4) Date: Oct. 12, 2012

(87) PCT Pub. No.: WO2013/150614
PCT Pub. Date: Oct. 10, 2013

(65) Prior Publication Data
US 2013/0255394 A1  Oct. 3, 2013

(51) Int. Cl.
G01B 5/00 (2006.01)
G01B 21/32 (2006.01)
(Continued)

(52) U.S. Cl.
CPC .............. G01B 21/32 (2013.01); E21F 17/185 (2013.01); G01V 1/008 (2013.01); G01V 99/00 (2013.01); G01L 5/16 (2013.01)

(58) Field of Classification Search
CPC .......... G01B 21/32; G01L 1/00; E21F 17/185
USPC ............................. 73/760, 784, 803, 152.49
See application file for complete search history.

(56) References Cited

U.S. PATENT DOCUMENTS 4,157,528 A * 6/1979 Shuck .............................. 338/42
4,279,299 A * 7/1981 Shuck .............................. 166/60
(Continued)

FOREIGN PATENT DOCUMENTS

CN 101213430 A 7/2008
EP 1909088 A1 11/2007
(Continued)

OTHER PUBLICATIONS

Ishii et al., Journal Earthquake of 2010.12.20, vol. 50, pp. 73-77, Continuous Stress Observation and Future Earthquake Prediction Research; partial translation provided.
(Continued)

*Primary Examiner* — Max Noori
(74) *Attorney, Agent, or Firm* — Quarles & Brady LLP; Gavin J. Milczarek-Desai

(57) ABSTRACT

A stress and strain sensing device capable of continuously sensing stress received from bedrock and strain of the bedrock over a long period of time is provided.

A stress and strain sensing device has a pillar-shaped case to be buried and installed in bedrock, a pressure receiving member that has two pressure receiving surfaces for sensing stress received from the bedrock and strain of the bedrock, wherein the two pressure receiving surfaces are both arranged on a common axis orthogonal to an axial direction of the case such that the two pressure receiving surfaces are exposed to an outside through an outer peripheral wall of the case and wherein the two pressure receiving surfaces are not connected with the case mechanically, and a displacement sensor that senses the stress received from the bedrock and the strain of the bedrock based on a displacement amount between the two pressure receiving surfaces.

6 Claims, 9 Drawing Sheets

(51) Int. Cl.
  *E21F 17/18* (2006.01)
  *G01V 1/00* (2006.01)
  *G01L 5/16* (2006.01)
  *G01V 99/00* (2009.01)

(56) References Cited

U.S. PATENT DOCUMENTS

| | | | | |
|---|---|---|---|---|
| 4,790,378 | A * | 12/1988 | Montgomery et al. | 166/66 |
| 5,042,595 | A * | 8/1991 | Ladanyi | 175/50 |
| 6,237,701 | B1 * | 5/2001 | Kolle et al. | 175/1 |
| 7,568,532 | B2 * | 8/2009 | Kuckes et al. | 175/40 |
| 2009/0114040 | A1 | 5/2009 | Mizuno | |
| 2013/0255394 | A1 * | 10/2013 | Ishii et al. | 73/784 |

FOREIGN PATENT DOCUMENTS

| | | | |
|---|---|---|---|
| JP | 54-44618 | Y2 | 12/1979 |
| JP | 57-165710 | A | 10/1982 |
| JP | 62-17694 | Y1 | 5/1987 |
| JP | 62-220823 | A | 9/1987 |
| JP | 5-87563 | A | 4/1993 |
| JP | 2506282 | B2 | 4/1993 |
| JP | 2004-264079 | | 9/2004 |
| JP | 2012-78233 | A | 4/2012 |
| WO | 2007004472 | A1 | 11/2007 |

OTHER PUBLICATIONS

Ishii et al., Development of multi-component borehole instrument for earthquake prediction study, some observed example of precursory and co-seismic phenomena relating to earthquake swarms and application of the instrument for rock mechanics 2005.

PCT/JP2012/059115—International Search Report; partial translation of Written Opinion.

* cited by examiner

Example of Observed Stress Seismic Waveforms

Earthquake occurred near Guam (M7.2)

STRESS AND STRAIN SENSING DEVICE

FIELD OF INVENTION

The present invention relates to a stress and strain sensing device and more specifically to a stress and strain sensing device that is buried and installed in bedrock to sense stress received from the bedrock and strain of the bedrock.

BACKGROUND ART

In anticipation of the Tokai-Tonankai Earthquake and the Nankai Great Earthquake that are thought to occur in the future, borehole-type strain meters are presently buried and installed in many observation points in Japan (30 locations or more). The strain meters are used by multiple research institutions and government agencies including the present applicant for earthquake prediction research.

The borehole-type strain meter is placed inside a borehole (boring hole) bored in the ground surface and is fixed with a grout, whereby the strain meter is buried and installed in underground bedrock. Thus, the strain meter continuously senses fluctuation of strain of the bedrock (expansion and contraction of bedrock) over a long period of time.

Each of Patent Document 1 and Non-patent Document 1 describes a strain amplification sensor that has a strain amplification mechanism for continuously amplifying the strain using the principle of leverage. The strain amplification sensor senses a displacement amount of a tip end of a lever, which is amplified by the strain amplification mechanism, with a displacement sensor. The strain amplification sensor is incorporated in and integrated with a cylindrical case and used as a borehole-type strain meter.

Patent Document 2 describes a borehole-type strain meter that has a cylindrical case filled with a fluid (silicone oil) and that senses deformation of the case based on a displacement amount of the fluid.

PRIOR TECHNICAL LITERATURES

Patent Document

[Patent Document 1] JP-A-H5-87563 (Japanese Patent No. 2101064)
[Patent Document 2] JP-A-S57-165710

Non-patent Document

[Non-patent Document 1] Ishii, H., T. Yamauchi, S. Matsumoto, Y. Hirata and S. Nakao, Development of multi-component borehole instrument for earthquake prediction study, some observed example of precursory and co-seismic phenomena relating to earthquake swarms and application of the instrument for bedrock mechanics, 365-377, Seismogenic Process Monitoring, 2002, Balkema

SUMMARY OF THE INVENTION

Problems to be Solved by the Invention

The conventional technology (technology described in Patent Document 1 and Non-patent Document 1 or Patent Document 2) senses the deformation of the cylindrical case and senses the strain of the bedrock based on the deformation of the case. Therefore, deformations in the entire case relate to each other, so it is difficult to independently and correctly sense the strain of the bedrock applied to the case in a certain direction.

The most important measurement component in observation of elasto-plastic deformation of the bedrock for the earthquake prediction research is not the strain of the bedrock but stress directly relating to occurrence of the earthquake.

However, the conventional technology only senses the strain of the bedrock. Therefore, the only way to obtain the stress received from the bedrock is measuring an elastic constant of the bedrock separately and obtaining the stress as the result of complex computation based on the sensed strain of the bedrock. That is, the conventional technology could only indirectly obtain the stress received from the bedrock.

Presently, there exists no device that can continuously and directly sense the stress received from the bedrock and the strain of the bedrock over a long period of time.

It is an object of the present invention to provide a stress and strain sensing device that can continuously and directly sense stress received from bedrock and strain of the bedrock over a long period of time.

Means for Solving the Problems

The inventors of the present invention studied hard in order to solve the above problems and consequently reached following aspects of the present invention.

First Aspect of the Present Invention

A first aspect provides a stress and strain sensing device having:
a pillar-shaped case to be buried and installed in bedrock;
a pressure receiving member that has two pressure receiving surfaces for sensing stress received from the bedrock and strain of the bedrock, wherein the two pressure receiving surfaces are both arranged on a common axis orthogonal to an axial direction of the case such that the two pressure receiving surfaces are exposed to an outside through an outer peripheral wall of the case and wherein the pressure receiving member is not connected with the case mechanically; and
a displacement sensor that senses the stress received from the bedrock and the strain of the bedrock based on a displacement amount between the two pressure receiving surfaces.

While a sensing level of the strain of the bedrock varies according to properties of the bedrock, the stress received from the bedrock is substantially independent of the properties of the bedrock. Therefore, the stress and strain sensing device can sense the stress received from the bedrock regardless of the properties of the bedrock.

The case is deformed by the stress received from the bedrock and the strain of the bedrock. However, the deformation of the case does not affect the displacement amount between the pressure receiving surfaces because the pressure receiving member is not connected with the case mechanically. Accordingly, the stress received from the bedrock and the strain of the bedrock can be sensed accurately.

The state where the pressure receiving member is not connected with the case mechanically means a state where the deformation of the case does not affect displacement of the pressure receiving member at least in an axial direction of the pressure receiving member even when the case deforms.

The two pressure receiving surfaces are both arranged on the same axis orthogonal to the direction of the central axis of the case. Therefore, the stress received from the bedrock in the direction of the axis, on which the two pressure receiving surfaces are arranged, and the strain of the bedrock in the same direction can be surely sensed.

As a result, a device that can continuously and directly sense an absolute value of the stress received from the bedrock over a long period of time and that has not existed before can be realized.

Second Aspect of the Present Invention

According to a second aspect, the stress and strain sensing device of the first aspect further has a substantially ring-shaped connection member that is connected to the two pressure receiving surfaces and that elastically deforms when the two pressure receiving surfaces receive the stress.

The connection member returns to its original shape according to the stress received by the pressure receiving surfaces. The displacement amount between the two pressure receiving surfaces changes according to the stress received from the bedrock. Therefore, a sensing result of the displacement sensor can be outputted.

The connection member has a substantially ring-like shape. Therefore, unwanted stress accompanying the elastic deformation of the connection member is not applied to the displacement sensor. Accordingly, there is no fear that the elastic deformation of the connection member adversely affects the sensing result of the displacement sensor.

Third Aspect of the Present Invention

According to a third aspect, the stress and strain sensing device of the first or second aspect has a plurality of the pressure receiving members provided to the case, wherein axial directions of the pressure receiving surfaces differ among the respective pressure receiving members.

Accordingly, each pressure receiving member can independently sense the stress received from the bedrock in the axial direction of its pressure receiving surfaces and the strain of the bedrock in the same direction. Therefore, tensor components of the stress and the strain can be obtained based on observations in the multiple directions. Thus, the stress and strain sensing device can be used for observation of tensor components of minute-scale stress and strain relating to the earthquake, the observation contributing to the earthquake prediction research.

Fourth Aspect of the Present Invention

According to a fourth aspect, the stress and strain sensing device of any one of the first to third aspects includes a stress amplification mechanism that continuously amplifies the stress applied to the two pressure receiving surfaces from the bedrock using the principle of leverage. The displacement sensor senses a displacement amount of a tip end of a lever amplified by the stress amplification mechanism.

As a result, even when the displacement amount between the two pressure receiving surfaces is small, the stress amplification mechanism amplifies the displacement amount. Accordingly, even when the stress applied to the pressure receiving surface from the bedrock and the strain of the bedrock are low-level, the stress and the strain can be surely sensed.

When the displacement amount between the two pressure receiving surfaces becomes very large, the displacement amount can be mechanically returned into a measurable range of the displacement sensor by a mechanical resetting system provided in the stress amplification mechanism.

BRIEF DESCRIPTION OF THE DRAWINGS

FIG. 3(A) is a top view, FIG. 3(B) is a front view, and FIG. 3(C) is a right-side view (or left-side view) in FIG. 3(A).

FIG. 5(A) is a front view, FIG. 5(B) is a side view, and FIG. 5(C) is a bottom view.

EMBODIMENT OF THE INVENTION

Figure 1:
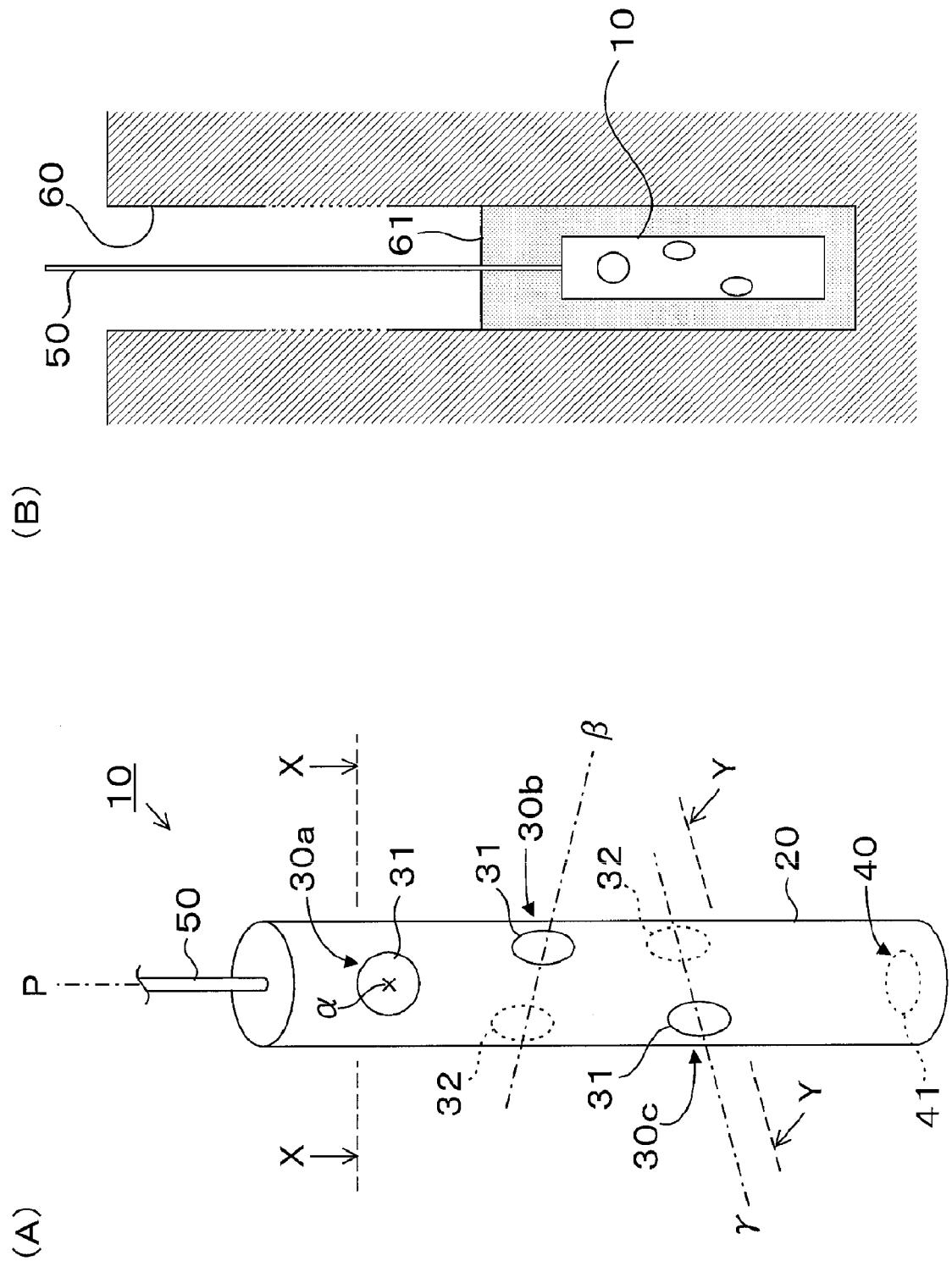
FIG. 1(A) is a perspective view showing an entire schematic structure of a stress and strain sensing device 10 according to one embodiment of the present invention.
FIG. 1(B) is an explanatory diagram for explaining a buried and installed state of the stress and strain sensing device 10.

Hereafter, a stress and strain sensing device (stress-strain meter) 10 according to one embodiment of the present invention will be described with reference to the drawings. The same components of the stress and strain sensing device 10 are indicated with the same reference numeral.

As shown in FIG. 1(A), the stress and strain sensing device 10 is constituted by a case 20, horizontal stress component sensing units (pressure receiving members) 30a to 30c, a vertical stress component sensing unit 40 and a communication cable 50.

The communication cable 50 extends from an upper end of the case 20 having a cylindrical shape.

The horizontal stress component sensing units 30a to 30c and the vertical stress component sensing unit 40 are attached to the case 20, which is fluid-tight.

An outer diameter of the case 20 is approximately 10 cm.

As shown in FIG. 1(B), the stress and strain sensing device 10 is placed near a bottom of a borehole (boring hole) 60 inside the borehole 60. The borehole 60 is bored to be vertical to a ground surface. A peripheral surface of the stress and strain sensing device 10 is fixed with an expansive grout 61. Thus, the case 20 of the stress and strain sensing device 10 is buried and installed vertically with respect to underground bedrock and is integrated with the bedrock.

The communication cable 50 of the stress and strain sensing device 10 extends to the ground.

The stress and strain sensing device 10 may be buried and placed in the bedrock by pouring the grout 61 into the borehole 60 first and then submerging the stress and strain sensing device 10 in the grout 61.

Each of the horizontal stress component sensing units (sensing pistons) 30a to 30c has two pressure receiving surfaces 31, 32.

The pressure receiving surfaces 31, 32 are arranged on the same one of axes (horizontal axes) α to γ orthogonal to a central axis (vertical axis) P of the case 20. The pressure receiving surfaces 31, 32 are exposed to an outside through an outer peripheral wall of the case 20. The pressure receiving surfaces 31, 32 are planes perpendicular to each one of the axes α to γ.

The vertical stress component sensing unit 40 has a single pressure receiving surface 41, which is arranged on the central axis P of the case 20 and exposed to an outside through a bottom portion of the case 20.

Therefore, the pressure receiving surfaces 31, 32, 41 receive stress from the bedrock respectively.

Figure 2:
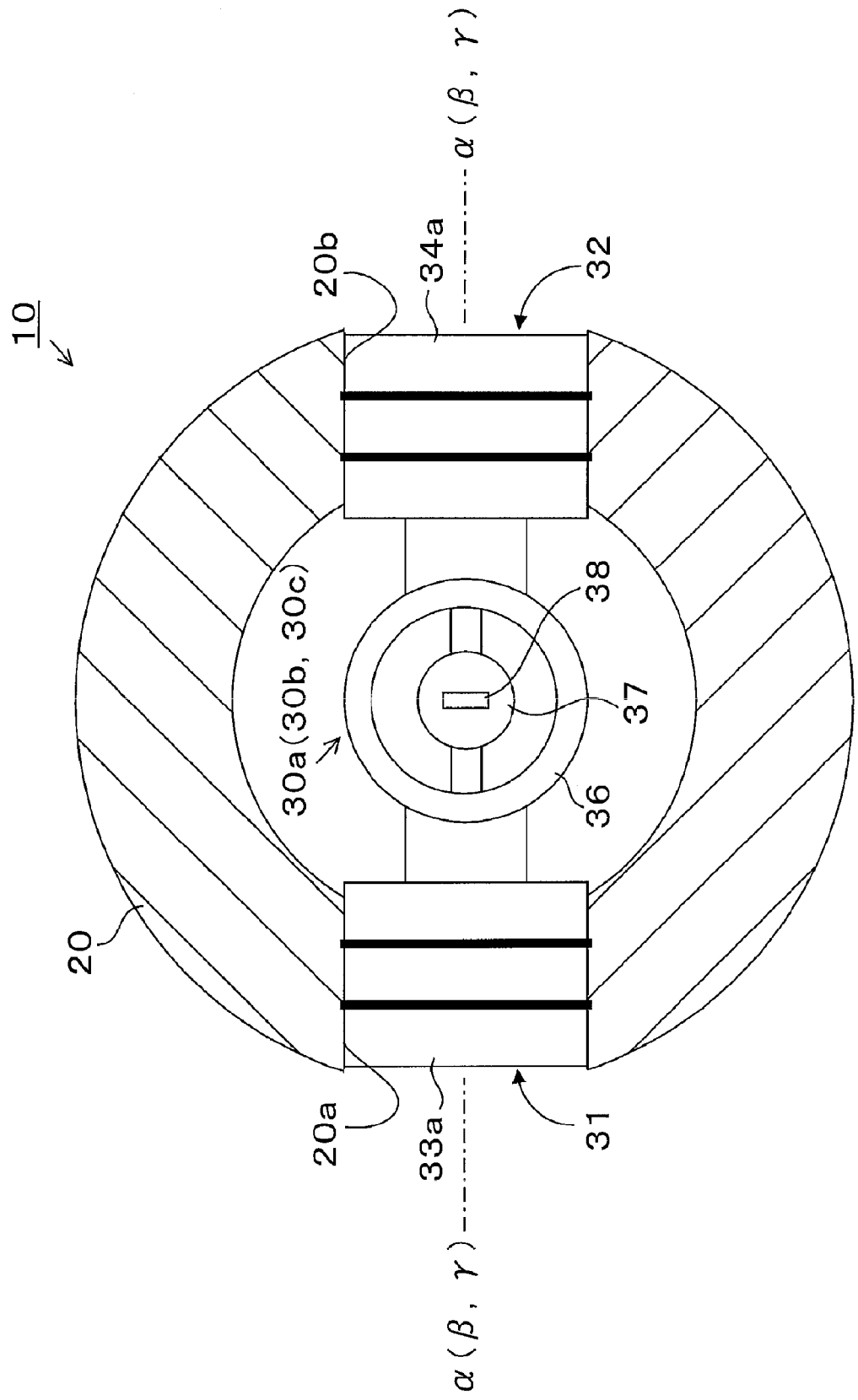
FIG. 2 is a transverse cross-sectional view showing the stress and strain sensing device 10 for explaining an attached state of horizontal stress component sensing units 30a to 30c and is a cross-sectional view taken along the line X-X in FIG. 1(A).

FIG. 2 is a cross-sectional view taken along the line X-X in FIG. 1(A).

Figure 3:
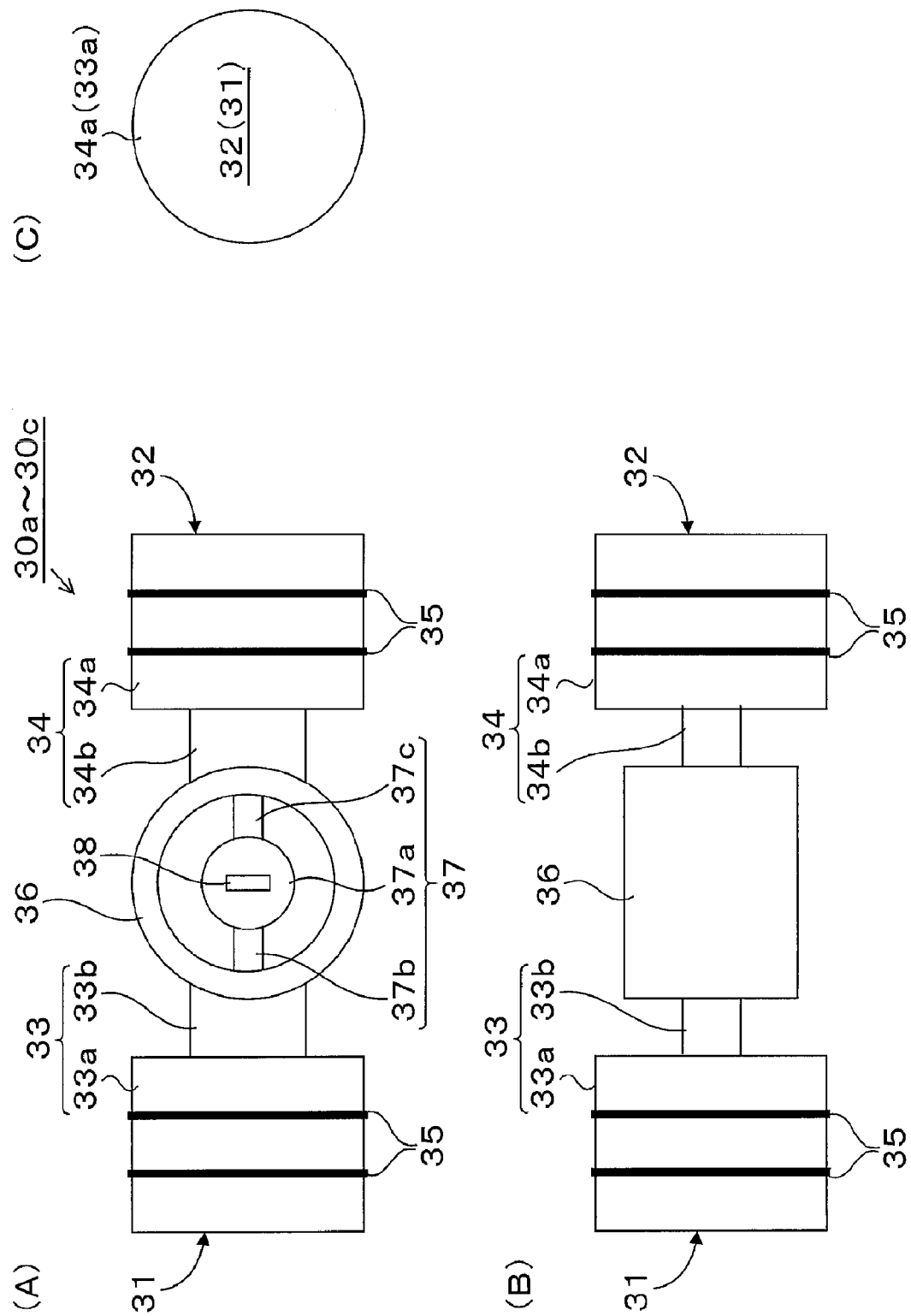
FIG. 3 is an appearance view showing a schematic configuration of the horizontal stress component sensing units 30a to 30c.

FIGS. 3(A) to 3(C) are respectively a top view, a front view, and a right-side view (or left-side view) of the horizontal stress component sensing units 30a to 30c.

The case 20 is formed in the shape of a cylinder with uniform thickness. The horizontal stress component sensing units 30a to 30c are attached inside the case 20.

The three horizontal stress component sensing units 30a to 30c have the same configuration. Each of the horizontal stress component sensing units 30a to 30c is constituted by base parts 33, 34, O-rings 35, a frame member (connection member) 36, a stress amplifying device (stress amplification mechanism) 37, and a displacement sensor 38.

The base parts 33, 34 have the same configuration and have main body portions 33a, 34a and attachment portions 33b, 34b respectively.

Top surfaces of the main body portions 33a, 34a in cylindrical shapes serve as the pressure receiving surfaces 31, 32 respectively.

The pressure receiving surfaces 31, 32 are formed to be substantially flat. Alternatively, holes (not shown) for fixing a tool used for attaching the horizontal stress component sensing units 30a to 30c to the case 20 may be formed in the pressure receiving surfaces 31, 32.

The main body portions 33a, 34a are inserted through circular mounting holes 20a, 20b penetrating through the outer peripheral wall of the case 20.

The main body portions 33a, 34a have outer diameters substantially equal to inner diameters of the mounting holes 20a, 20b and have lengths substantially equal to the thickness of the case 20.

The multiple O-rings 35 (two O-rings in example) are wound and fixed around each of the outer peripheral walls of the main body portions 33a, 34a along a circumferential direction such that the O-rings 35 are separate from each other.

Accordingly, the main body portions 33a, 34a can fluid-tightly slide in the horizontal direction (direction of each of axes α to γ) with respect to the mounting holes 20a, 20b of the case 20.

The cylindrical attachment portions 33b, 34b are provided to top surfaces of the main body portions 33a, 34a opposite from the pressure receiving surfaces 31, 32.

The frame member 36 formed substantially in a ring shape (substantially cylindrical shape) is held between the attachment portions 33b, 34b, whereby the frame member 36 is integrated with the base parts 33, 34.

The case 20, the base parts 33, 34 and the frame member 36 are made of a metal material (for example, stainless steel) having high rigidity and high corrosion resistance.

The stress amplifying device 37 has the same configuration as the strain amplification mechanism described in Patent Document 1 (JP-A-H5-87563) and has a base plate 37a, a stress applying portion 37b and a fixed portion 37c.

The stress applying portion 37b and the fixed portion 37c are provided to both end portions of the base plate 37a. The displacement sensor 38 is provided to the base plate 37a.

The stress applying portion 37b is fixedly connected to the base part 33 through the frame member 36.

The fixed portion 37c is fixedly connected to the base part 34 through the frame member 36.

The base plate 37a, the stress applying portion 37b, the fixed portion 37c and the displacement sensor 38 correspond to "the base plate 1," "the strain applying portion 2," "the fixed portion 3" and "the displacement sensor 9" of Patent Document 1 respectively.

Members corresponding to "the grooved part 4" and "the levers 5 to 7" of Patent Document 1 are formed in the base plate 37a but are not shown in the drawings.

Figure 4:
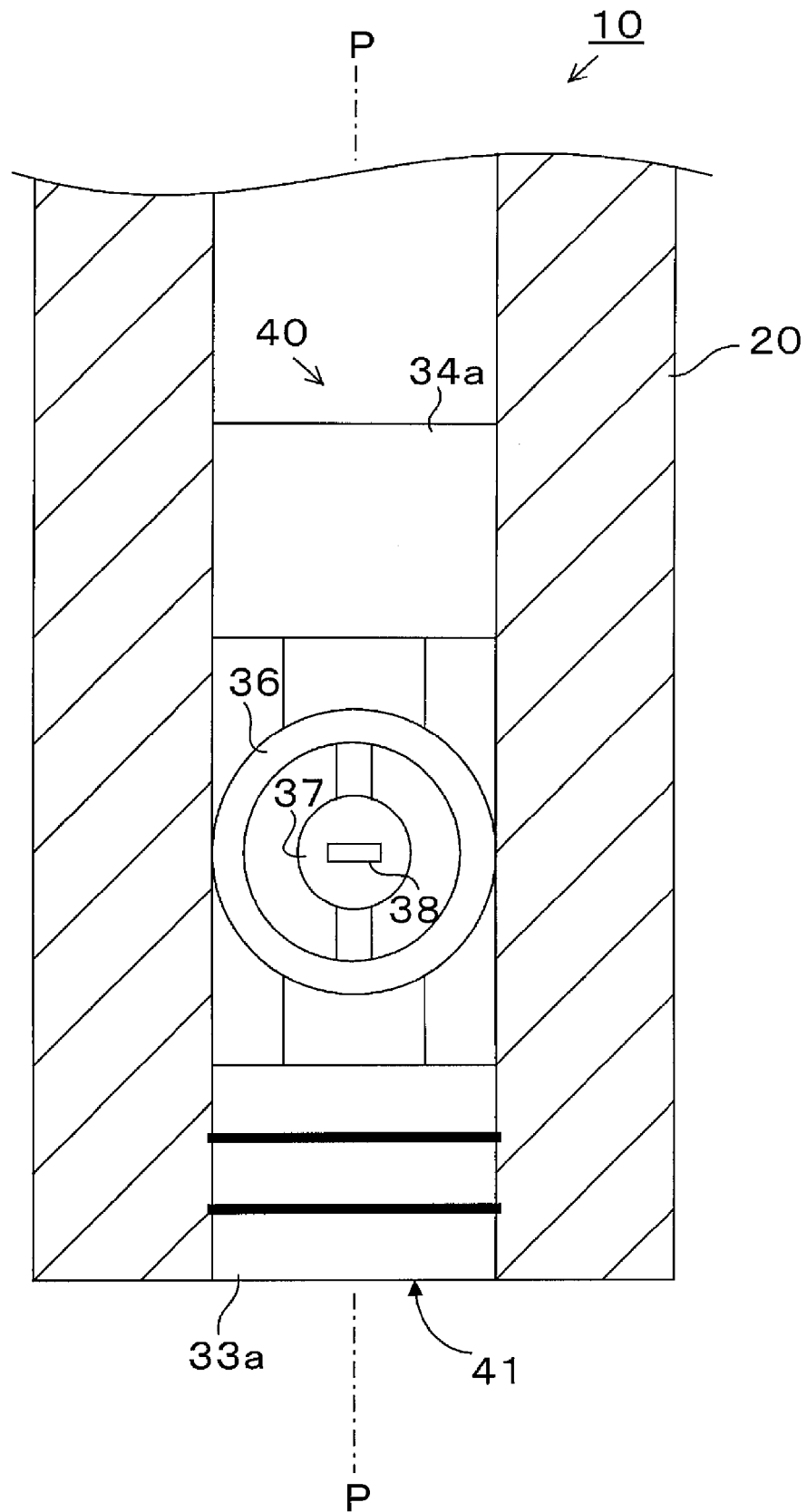
FIG. 4 is a longitudinal cross-sectional view showing the stress and strain sensing device 10 for explaining an attached state of a vertical stress component sensing unit 40 and is a cross-sectional view taken along the line Y-Y in FIG. 1(A).

FIG. 4 is a cross-sectional view taken along the line Y-Y in FIG. 1(A).

Figure 5:
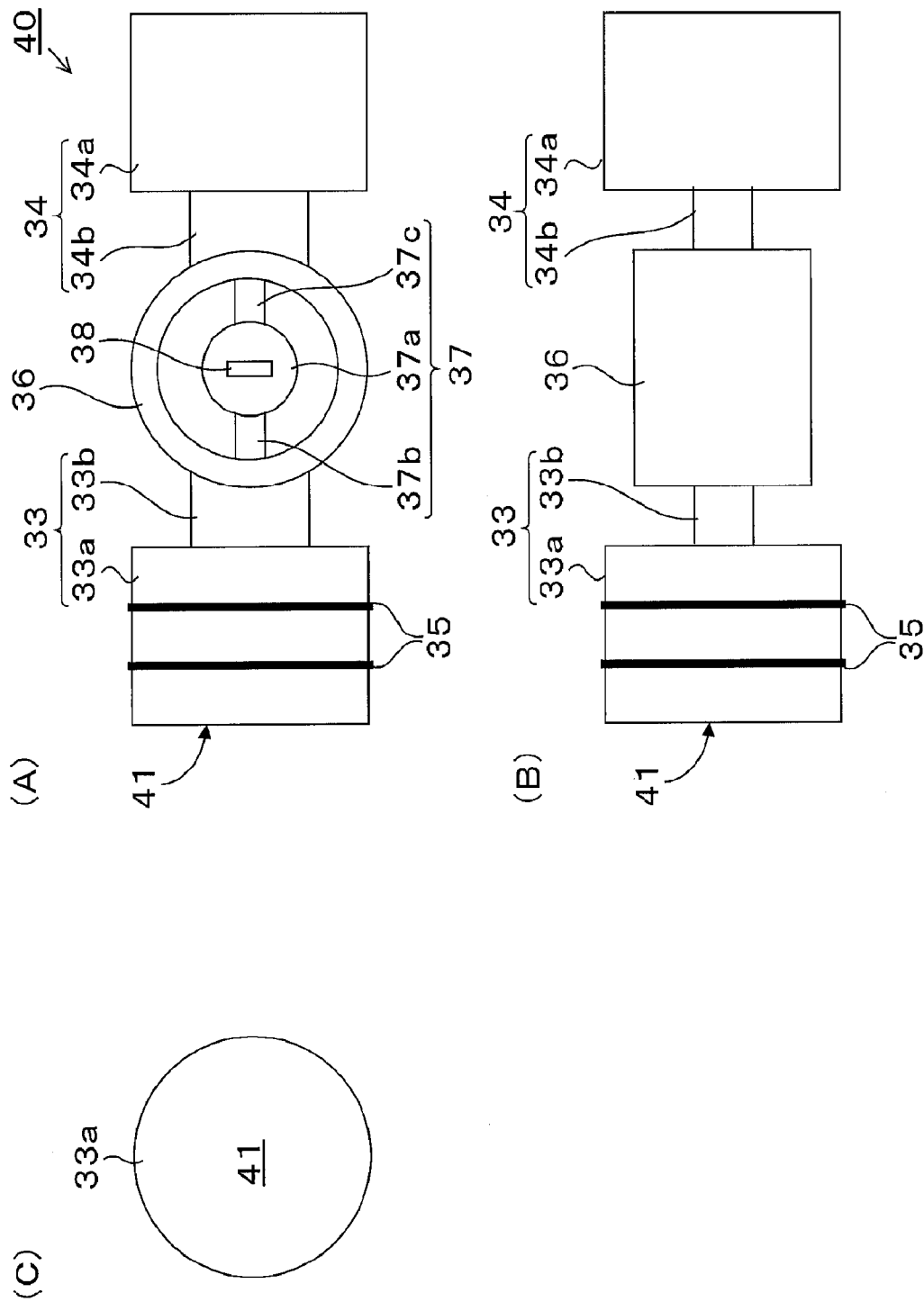
FIG. 5 is an appearance view showing a schematic configuration of the vertical stress component sensing unit 40.

FIGS. 5(A) to 5(C) are a front view, a side view and a bottom view of the vertical stress component sensing unit 40 respectively.

The vertical stress component sensing unit 40 is different from the horizontal stress component sensing units 30a to 30c in following points.

[i] A top surface of the main body portion 33a of the base part 33 serves as the pressure receiving surface 41.

[ii] The main body portion 33a has an outer diameter substantially equal to an inner diameter of the case 20. The main body portion 33a is inserted through a bottom portion of the case 20 and can fluid-tightly slide in a vertical direction (direction of the central axis P) with respect to the case 20.

[iii] No O-ring is provided to the main body portion 34a of the base part 34. The main body portion 34a is fixedly attached to the case 20.

<Operations and Effects of Embodiment>

The stress and strain sensing device 10 of the present embodiment realizes following operations and effects.

[1] The stress and strain sensing device 10 continuously senses fluctuations of the horizontal components and the vertical components of the stress received from the bedrock and the strain of the bedrock over a long period of time. That is, the stress and strain sensing device 10 senses the horizontal components of the stress applied to the bedrock and the strain of the bedrock using the horizontal stress component sensing units 30a to 30c. The stress and strain sensing device 10 senses the vertical components of the stress applied to the bedrock and the strain of the bedrock using the vertical stress component sensing unit 40.

At that time, while a sensing level of the strain of the bedrock varies according to properties of the bedrock, the stress received from the bedrock is substantially independent of the properties of the bedrock. Therefore, the stress and strain sensing device 10 can sense the stress received from the bedrock regardless of the properties of the bedrock.

Thus, the stress and strain sensing device 10 as a device that can continuously and directly sense an absolute value of the stress received from the bedrock over a long period of time and that has not existed before can be realized.

The displacement sensor 38 of each of the sensing units 30a to 30c, 40 converts the sensing results of the stress received from the bedrock and the strain of the bedrock into electric signals or optical signals. Then, the displacement sensor 38 transmits the signals to a data logger (not shown) installed on the ground through the communication cable 50.

The sensing results of the displacement sensor 38 may be stored in a storage device (not shown) such as a semiconductor memory incorporated in the stress and strain sensing device 10.

[2] Each of the horizontal stress component sensing units 30a to 30c is configured such that, when the stress received from the bedrock is applied to the pressure receiving surfaces 31, 32, the main body portions 33a, 34a of the base parts 33, 34 slide with respect to the mounting holes 20a, 20b of the case 20. Thus, a distance between the stress applying portion 37b and the fixed portion 37c of the stress amplifying device 37 changes along each of the axes α to γ in the base parts 33, 34.

If the stress received from the bedrock increases, the base parts 33, 34 move toward the central axis P of the case 20. If the stress received from the bedrock decreases, the base parts 33, 34 move away from the central axis P of the case 20.

The displacement sensor 38 attached to the base plate 37a of the stress amplifying device 37 senses a displacement amount between the pressure receiving surfaces 31, 32 by sensing a displacement amount between the stress applying portion 37b and the fixed portion 37c. The displacement sensor 38 senses the horizontal components of the stress applied to the bedrock and the strain of the bedrock based on the displacement amount.

The displacement amount between the pressure receiving surfaces 31, 32 is within several micrometers.

The components of the horizontal stress component sensing units 30a to 30c (base parts 33, 34, O-rings 35, frame members 36, stress amplification mechanisms 37, displacement sensors 38) are not fixed to the case 20. Movements of the components are unaffected by the case 20.

That is, the horizontal stress component sensing units 30a to 30c are not connected with the case 20 mechanically (dynamically).

In other words, the state where the horizontal stress component sensing units 30a to 30c are not connected with the case 20 mechanically means that, even when the case 20 deforms, the deformation does not affect the displacements of the horizontal stress component sensing units 30a to 30c at least in the directions of the axes α to γ.

Therefore, even when the case 20 is deformed by the stress received from the bedrock and the strain of the bedrock, the deformation of the case 20 does not affect the displacement amounts between the pressure receiving surfaces 31, 32 because the horizontal stress component sensing units 30a to 30c are not connected with the case 20 mechanically.

Accordingly, the horizontal stress component sensing units 30a to 30c can accurately sense the stresses, which are received by the pressure receiving surfaces 31, 32 from the bedrock, and the strains of the bedrock based on the displacement amounts between the pressure receiving surfaces 31, 32.

The two pressure receiving surfaces 31, 32 are arranged on the same one of the axes (horizontal axes) α to γ orthogonal to the direction of the central axis P of the case 20 and are exposed to the outside through the outer peripheral wall of the case 20. Therefore, the stresses received by the stress and strain sensing device 10 from the bedrock in the directions of the axes α to γ and the strains of the bedrock in the same directions can be surely sensed.

[3] The frame member 36 of each of the horizontal stress component sensing units 30a to 30c is connected to the pressure receiving surfaces 31, 32 through the base parts 33, 34. The frame member 36 deforms elastically when the pressure receiving surfaces 31, 32 receive additional stress from the bedrock and returns to the original shape when the stress applied to the pressure receiving surfaces 31, 32 is removed.

Therefore, if the frame member 36 returns to its original shape, the displacement amount between the pressure receiving surfaces 31, 32 also returns to the displacement amount in the state before the pressure receiving surfaces 31, 32 receive the additional stress from the bedrock.

The peripheral surface of the stress and strain sensing device 10 is fixed with the expansive grout 61 and integrated with the bedrock (see FIG. 1(B)). Therefore, the frame member 36 of each of the horizontal stress component sensing units 30a to 30c has already caused the elastic deformation in the state where the stress and strain sensing device 10 is buried and installed. The signal level outputted from each displacement sensor 38 is not zero but reflects the initial stress.

The frame member 36 is formed substantially in the ring shape. Therefore, unwanted stress caused by the elastic deformation of the frame member 36 is not applied to the displacement sensor 38. Accordingly, there is no fear that the elastic deformation of the frame member 36 adversely affects the sensing result of the displacement sensor 38.

The frame member 36 is integrated with the base parts 33, 34. Therefore, strength of the entirety of the horizontal stress component sensing units 30a to 30c can be improved.

[4] The case 20 has the three horizontal stress component sensing units 30a to 30c. The directions of the axes α to γ of the pressure receiving surfaces 31, 32 of the horizontal stress component sensing units 30a to 30c are different from each other.

Figure 6:
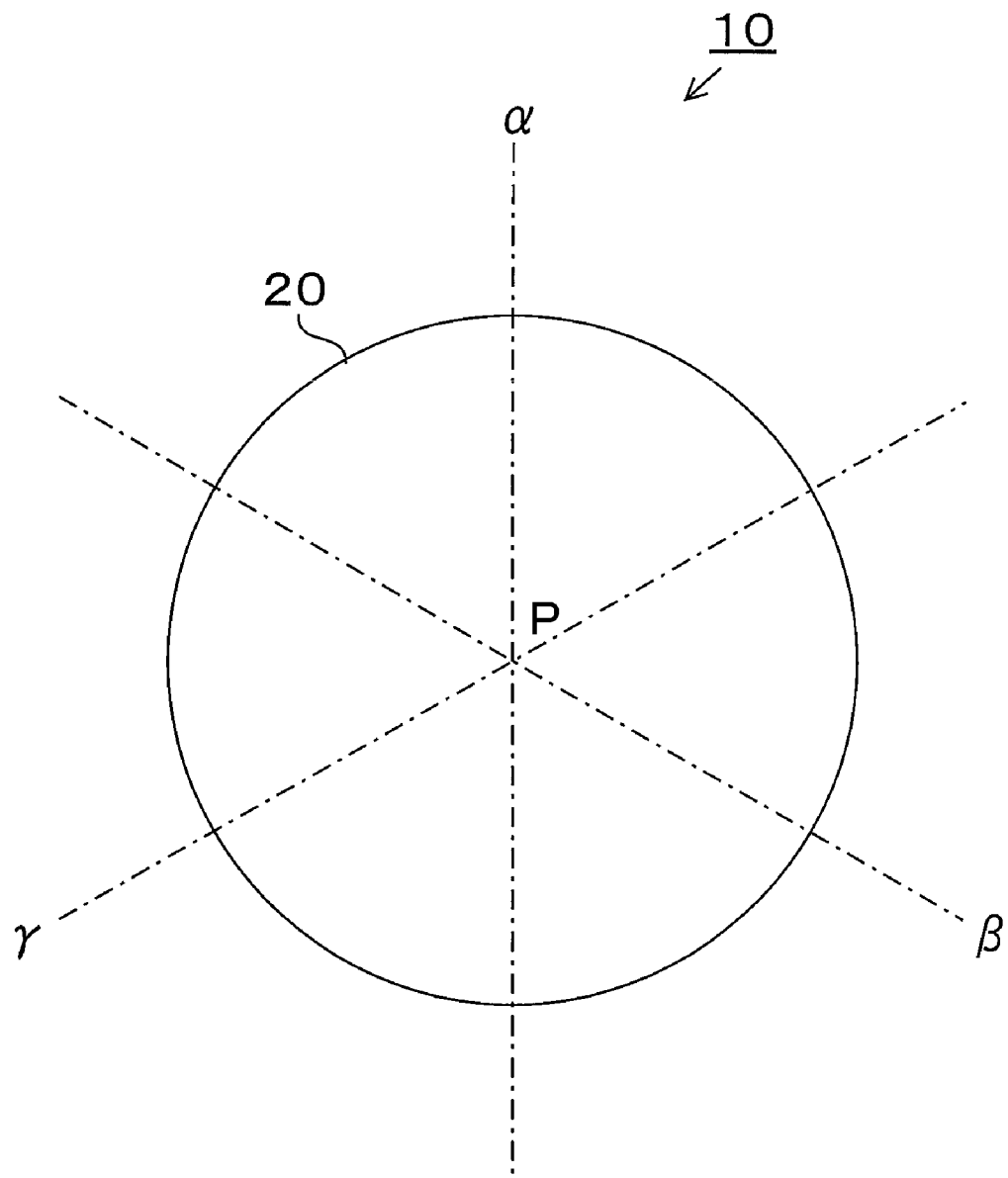
FIG. 6 is an explanatory diagram for explaining axes $\alpha$ to $\gamma$, on which pressure receiving surfaces 31, 32 of the horizontal stress component sensing units 30a to 30c are arranged.

As shown in FIGS. 1 and 6, the axes (horizontal axes) α to γ having different directions intersect with each other at the center of the case 20, and the axes α to γ are rotated from each other by 120 degrees each.

Accordingly, the horizontal stress component sensing units 30a to 30c can sense the stresses received from the bedrock in the directions of the axes α to γ and the strains of the bedrock in the same directions independently and respectively. Thus, tensor components of the stresses and the strains can be obtained based on the observation in the multiple directions. Thus, the stress and strain sensing device 10 can be used in tensor component observation of very-low-level stress and strain related to the earthquake, the observation contributing to the earthquake prediction research.

[5] The stress amplifying device 37 of each of the horizontal stress component sensing units 30a to 30c continuously amplifies the stress, which is received by the pressure receiving surfaces 31, 32 from the bedrock, using the principle of leverage. The description of the operation of the stress amplifying device 37 is detailed in Patent Document 1 and is omitted here.

The displacement sensor 38 senses the displacement amount between the pressure receiving surfaces 31, 32 by sensing the displacement amount of the tip end of the lever amplified by the stress amplifying device 37. Thus, the displacement sensor 38 senses the stress received from the bedrock and the strain of the bedrock based on the displacement amount.

Even when the displacement amount between the pressure receiving surfaces 31, 32 is small, the stress amplifying device 37 amplifies the displacement amount. Therefore, even when the stress received by the pressure receiving surfaces 31, 32 from the bedrock and the strain of the bedrock are low-level, the stress and the strain can be surely sensed.

When the displacement amount between the pressure receiving surfaces 31, 32 becomes very large, the displacement amount can be mechanically returned into a measurable range of the displacement sensor 38 by the mechanical resetting system provided in the stress amplifying device 37.

[6] In the vertical stress component sensing unit 40, when the stress received from the bedrock is applied to the pressure receiving surface 41, the main body portion 33a of the base part 33 slides with respect to the inner peripheral wall of the case 20, and the base part 33 moves along the central axis P of the case 20. As a result, the distance between the stress applying portion 37b and the fixed portion 37c in the stress amplifying device 37 changes.

The displacement sensor 38 attached to the base plate 37a of the stress amplifying device 37 senses the displacement amount between the pressure receiving surface 41 and the main body portion 34a by sensing the displacement amount between the stress applying portion 37b and the fixed portion 37c. Thus, the displacement sensor 38 senses vertical components of the stress applied to the bedrock and the strain of the bedrock based on the displacement amount.

The main body portion 34a of the vertical stress component sensing unit 40 is fixed to the case 20. The main body portion 34a has sufficient thickness and hardness and has high rigidity.

Thus, even when the case 20 is deformed by the stress received from the bedrock and the strain of the bedrock, the deformation of the case 20 hardly affects the displacement amount between the pressure receiving surface 41 and the main body portion 34a because of the high rigidity of the main body portion 34a.

Consequently, the vertical component sensing unit 40 can accurately sense the stress received by the pressure receiving surface 41 from the bedrock and the strain of the bedrock based on the displacement amount between the pressure receiving surface 41 and the main body portion 34a.

[7] The frame member 36 of the vertical component sensing unit 40 is connected with the pressure receiving surface 41 through the base part 33 and is connected with the main body portion 34a through the attachment portion 34b. The frame member 36 elastically deforms when the pressure receiving surface 41 receives additional stress from the bedrock and returns to its original shape when the stress applied to the pressure receiving surface 41 is removed.

Accordingly, if the frame member 36 returns to its original shape, the displacement amount between the pressure receiving surface 41 and the main body portion 34a also returns to the displacement amount in the state before the pressure receiving surface 41 receives the additional stress from the bedrock.

The peripheral surface of the stress and strain sensing device 10 is fixed with the expansive grout 61 and integrated with the bedrock (see FIG. 1(B)). Therefore, the frame member 36 of the vertical stress component sensing unit 40 has already caused elastic deformation in the state where the stress and strain sensing device 10 is buried and installed. Therefore, the signal level outputted by the displacement sensor 38 is not zero but reflects the initial stress.

[8] The stress amplifying device 37 of the vertical stress component sensing unit 40 continuously amplifies the stress, which is received by the pressure receiving surface 41 from the bedrock, using the principle of leverage.

The displacement sensor 38 senses the displacement amount between the pressure receiving surface 41 and the main body portion 34a by sensing the displacement amount of the tip end of the lever amplified by the stress amplifying device 37. Then, the displacement sensor 38 senses the stress received from the bedrock and the strain of the bedrock based on the displacement amount.

Even when the displacement amount between the pressure receiving surface 41 and the main body portion 34a is small, the stress amplifying device 37 amplifies the displacement amount. Therefore, even when the stress received by the pressure receiving surface 41 from the bedrock and the strain of the bedrock are low-level, the stress and the strain can be surely sensed.

When the displacement amount between the pressure receiving surface 41 and the main body portion 34a becomes very large, the displacement amount can be mechanically returned into a measurable range of the displacement sensor 38 by the mechanical resetting system provided in the stress amplifying device 37.

Figure 7:
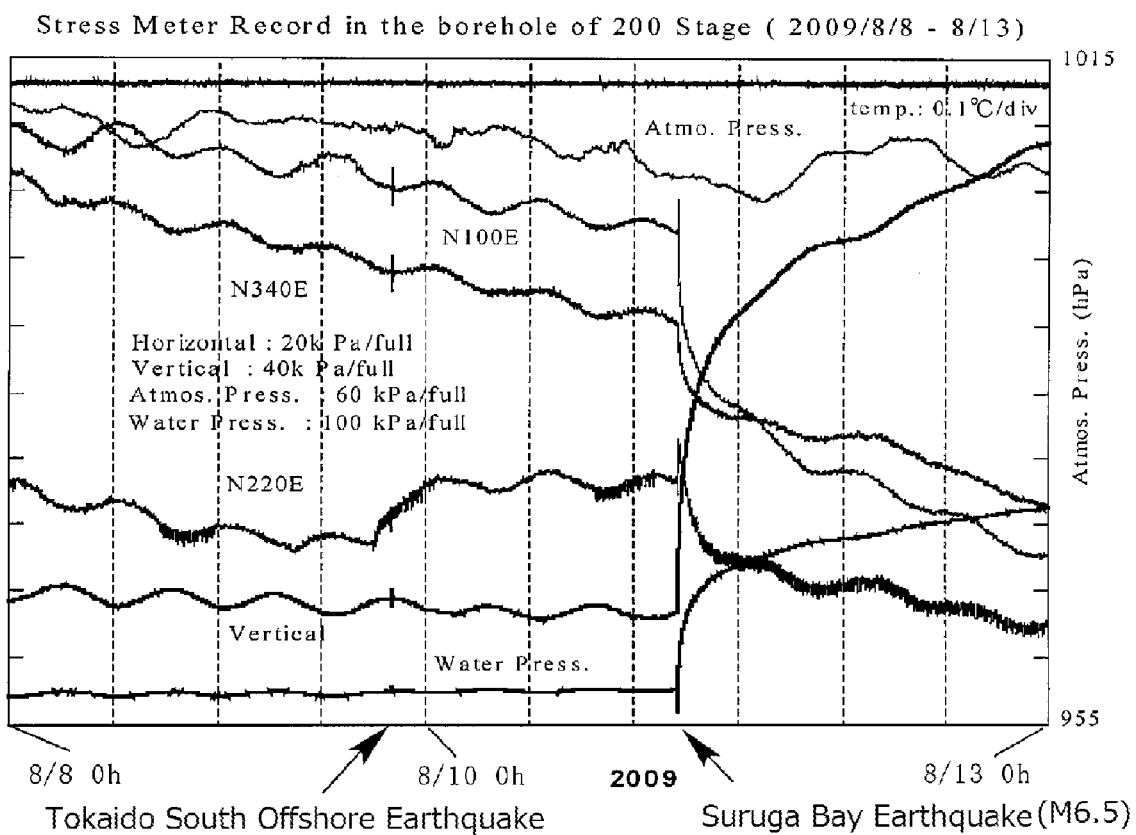
FIG. 7 is a measurement chart illustrating a measurement record of stress sensed with the stress and strain sensing device 10.

[9] FIG. 7 is a measurement chart illustrating a measurement record of stress sensed with the stress and strain sensing device 10.

Figure 8:
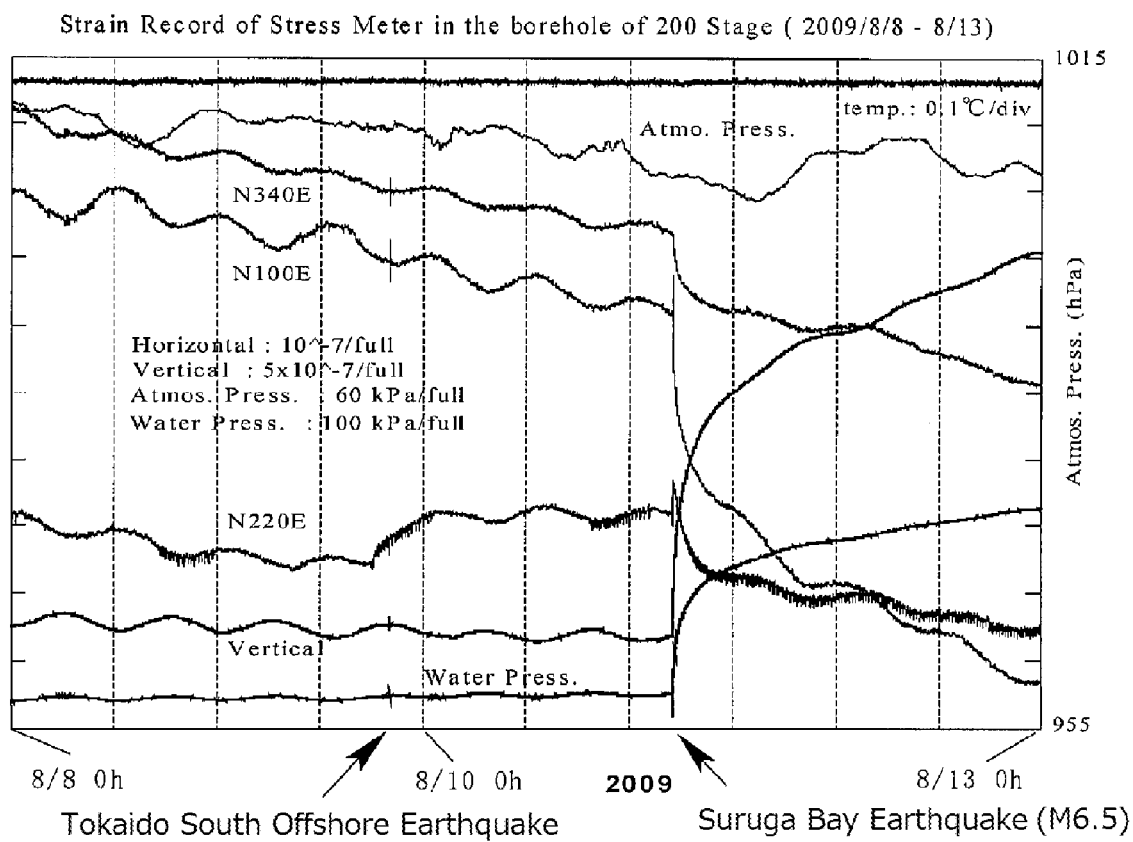
FIG. 8 is a measurement chart illustrating a measurement record of strain sensed with the stress and strain sensing device 10.

FIG. 8 is a measurement chart illustrating a measurement record of strain sensed with the stress and strain sensing device 10.

Figure 9:
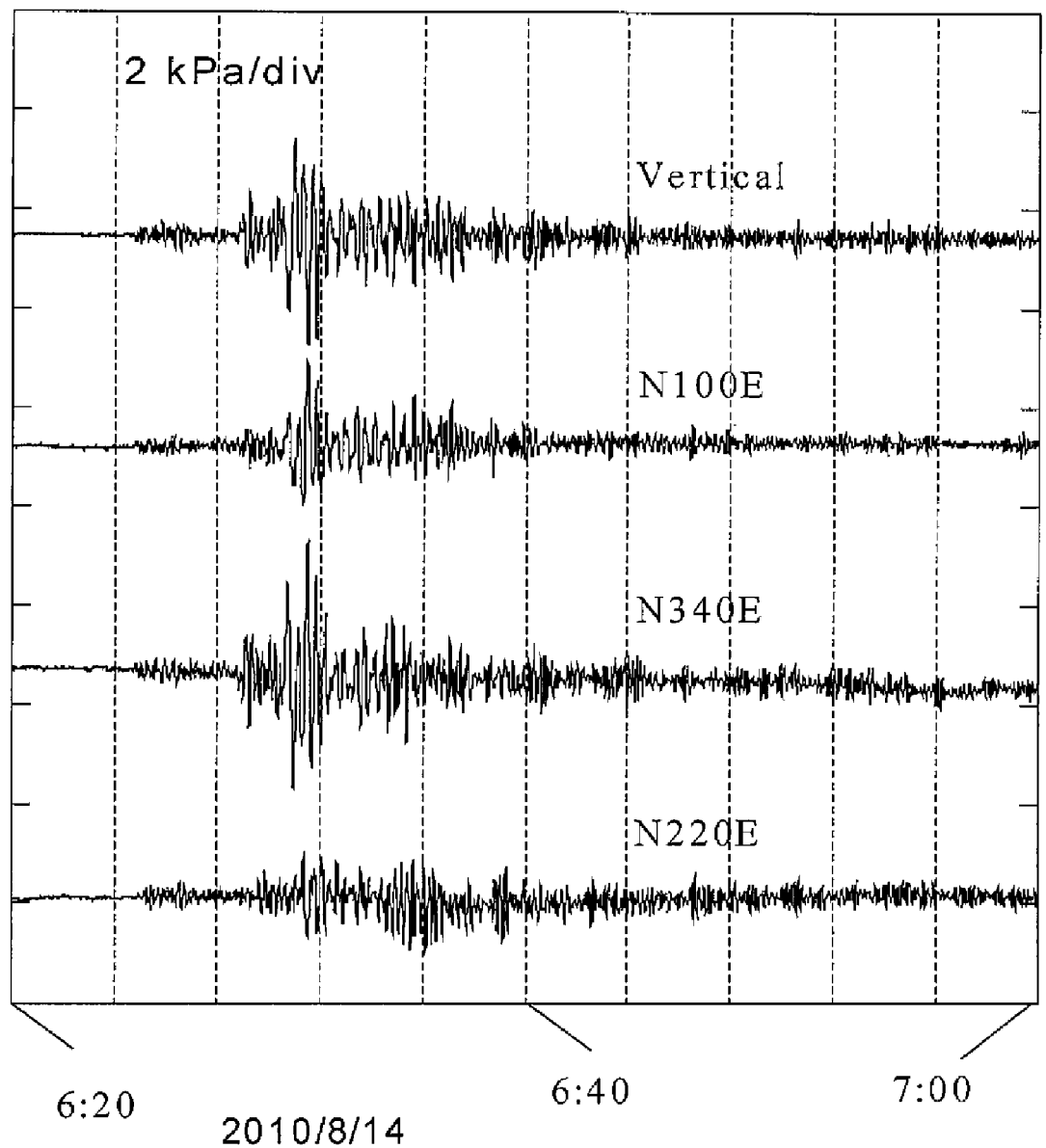
FIG. 9 is a measurement chart illustrating a measurement record of stress seismic waveforms of an earthquake that occurred near Guam sensed with the stress and strain sensing device 10.

FIG. 9 is a measurement chart illustrating a measurement record of stress seismic waveforms of an earthquake occurred near Guam sensed with the stress and strain sensing device 10.

In the measurement examples shown in FIGS. 7 to 9, the stress and strain sensing device 10 is buried and installed in the bedrock at the depth of 200 meters below the surface of the ground in Mizunami City.

"N220E," "N100E" and "N340E" in FIGS. 7 to 9 illustrate the directions of the horizontal stress component sensing units 30a to 30c and indicate the horizontal components in the directions of "220°," "100°" and "340°" clockwise from north respectively.

"Vertical" in FIGS. 7 to 9 indicates the sensing results of the vertical stress component sensing unit 40.

"Temp" in FIGS. 7 and 8 indicates the sensing results of a thermometer (not shown) incorporated in the stress and strain sensing device 10.

"Atmo. Press." in FIGS. 7 and 8 indicates the sensing results of atmospheric pressure.

"Water. Press." in FIGS. 7 and 8 indicates the results sensed by a water pressure meter (not shown) installed inside the borehole 60, in which the stress and strain sensing device 10 is buried and installed.

FIGS. 7 and 8 show that diurnal changes of crustal stress and crustal strain due to the earth tide caused by the attracting forces of the moon and the sun and the ocean tides are clearly measured. The measurement record shows that the stress received by the stress and strain sensing device 10 from the bedrock and the strain of the bedrock can be sensed with high sensitivity.

Changes caused by the Tokaido South Offshore Earthquake and the Suruga Bay Earthquake are shown in terms of the stress received from the bedrock in FIG. 7 and in terms of the strain of the bedrock in FIG. 8.

Waveforms of seismic waves are not shown because the time axes are contracted in FIGS. 7 and 8.

In contrast, FIG. 9 clearly shows only the stress seismic waveforms because the time axis is stretched.

As above, FIGS. 7 to 9 show that the changes of the stress received from the bedrock and the strain of the bedrock due to the far earthquake can be also sensed.

Although not shown in FIG. 9 and the specification, many observation results obviously show that the stress and strain sensing device 10 has sufficient sensitivity capable of sensing any earthquake occurring in any place in the world if the magnitude of the earthquake is equal to or greater than 6.5.

[10] The displacement sensor 38 of each of the sensing units 30*a* to 30*c*, 40 converts the sensing results of the stress received from the bedrock and the strain of the bedrock into electric signals or optical signals.

Therefore, change characteristics of a signal level of the electric signal or the optical signal of the displacement sensor 38 with respect to changes of the stress received from the bedrock and the strain of the bedrock may be obtained beforehand by any of following test methods. By doing so, accurate characteristics between the signal level and the stress can be obtained and also accurate characteristics between the signal level and the strain can be obtained.

The following test methods enable continuous sensing of absolute values of the stress and the strain at the point where the stress and strain sensing device 10 is buried and installed.

[a] Pressure Test: Test method to place the stress and strain sensing device 10 in a container capable of changing water pressure and to measure the change characteristics of the signal level of the displacement sensor 38 with respect to the change of the water pressure in the container.

[b] Load Test: Test method to apply a load to each of the pressure receiving surfaces 31, 32, 41 from a load detector and to measure the change characteristics of the signal level of the displacement sensor 38 with respect to the change of the load.

[c] Strain Test: Test method to change the displacement applied to each of the pressure receiving surfaces 31, 32, 41 and to measure the change characteristics of the signal level of the displacement sensor 38 with respect to the change of the displacement.

<Other Embodiments>

The present invention is not limited to the above embodiment, but may be embodied as below. Also in this case, the operation and the effects similar to or better than the operation and the effects of the above embodiment can be exerted.

[1] The shape of the case 20 is not limited to the cylindrical shape, but may be any shape as long as the shape is a pillar-like shape.

[2] The number of the horizontal stress component sensing units 30*a* to 30*c* is not limited to three but may be equal to or less than two or may be equal to or greater than four. An axial direction of the pressure receiving surfaces 31, 32 of each horizontal stress component sensing unit may be set arbitrarily as required.

A unit having a configuration similar to the horizontal stress component sensing units 30*a* to 30*c* may be provided obliquely with respect to the direction of the central axis P. Thus, oblique components of the stress received from the bedrock and the strain of the bedrock may be sensed.

Three-dimensional tensor components of the stress and the strain can be obtained by sensing the horizontal, vertical and oblique components.

[3] When the stress amplifying device 37 has sufficient strength, the frame member 36 may be omitted.

[4] When the stress and strain sensing device 10 is buried and installed in a place where the fluctuations of the stress received from the bedrock and the strain of the bedrock are large, the stress amplifying device 37 may be omitted.

[5] In the above embodiment, the stress and strain sensing device 10 is placed inside the borehole 60 that is formed to be vertical with respect to the ground surface.

Alternatively, the stress and strain sensing device 10 may be placed in the borehole 60 that is formed in an oblique direction with respect to the ground surface, and the case 20 of the stress and strain sensing device 10 may be buried and installed along the borehole 60 bored in the underground bedrock and integrated with the bedrock.

[6] In construction works in deep undergrounds, tunnel constructions, mining works and the like, there is a possibility of occurrence of damages such as rock burst and rock falling, which can threaten human lives. It has been required to predict the occurrence of the damages and to reduce the damages.

In this point, the stress and strain sensing device 10 can be used not only for the earthquake prediction research but also for safety check in the above constructions and works and for prediction of abnormal changes.

The present invention is not limited to the description of the above aspects and the embodiments. The present invention includes various modifications, which may be easily thought by those who are skilled in the art, provided that the modifications do not depart from the description of appended claims. Entire contents of all the literatures, patent application publications and patent publications, which are explicitly shown in the present specification, are incorporated herein by reference.

DESCRIPTION OF THE NUMERALS

10 STRESS AND STRAIN SENSING DEVICE
20 CASE
31, 32, 41 PRESSURE RECEIVING SURFACE
30*a* to 30*c* HORIZONTAL STRESS COMPONENT SENSING UNIT (PRESSURE RECEIVING MEMBER)
40 VERTICAL STRESS COMPONENT SENSING UNIT
38 DISPLACEMENT SENSOR
36 FRAME MEMBER (CONNECTION MEMBER)
37 STRESS AMPLIFYING DEVICE (STRESS AMPLIFICATION MECHANISM)
60 BOREHOLE

The invention claimed is:

1. A stress and strain sensing device comprising:
a pillar-shaped case to be buried and installed in bedrock;
a pressure receiving member that has two pressure receiving surfaces for sensing stress received from the bedrock and strain of the bedrock, wherein the two pressure receiving surfaces are both arranged on a common axis orthogonal to an axial direction of the case such that the two pressure receiving surfaces are exposed to an outside through an outer peripheral wall of the case and wherein the pressure receiving member is not connected with the case mechanically;
a displacement sensor that senses the stress received from the bedrock and the strain of the bedrock based on a displacement amount between the two pressure receiving surfaces;
a member for providing fluid tightness between the pressure receiving member and the case such that the pressure receiving member can slide with respect to the case; and
a substantially ring-shaped connection member that is connected to the two pressure receiving surfaces and that elastically deforms when the two pressure receiving surfaces receive the stress, wherein the pressure receiving member and the connection member are formed as an integral body.

2. The stress and strain sensing device according to claim 1, further comprising:
a further pressure receiving member that has two pressure receiving surfaces for sensing stress received from the bedrock and strain of the bedrock, wherein the two pressure receiving surfaces are both arranged on a common axis oblique to the axial direction of the case such that the two pressure receiving surfaces are exposed to an outside through the outer peripheral wall of the case and wherein the further pressure receiving member is not connected with the case mechanically; and a further displacement sensor that senses the stress received from the bedrock and the strain of the bedrock based on a displacement amount between the two pressure receiving surfaces of the further pressure receiving member.

3. The stress and strain sensing device according to claim 1, wherein a plurality of the pressure receiving members are provided to the case, and axial directions of the pressure receiving surfaces differ among the respective pressure receiving members.

4. The stress and strain sensing device according to claim 1, further comprising:

a stress amplification mechanism that continuously amplifies the stress applied to the two pressure receiving surfaces from the bedrock using the principle of leverage, and the displacement sensor senses a displacement amount of a tip end of a lever amplified by the stress amplification mechanism.

5. The stress and strain sensing device according to claim 1, wherein the pressure receiving member has a cylindrical member having length substantially equal to thickness of the case, and an end face of the cylindrical member defines the pressure receiving surface.

6. The stress and strain sensing device according to claim 1, further comprising:

another pressure receiving member that has a pressure receiving surface for sensing stress received from the bedrock and strain of the bedrock, wherein the pressure receiving surface is arranged along the axial direction of the case such that the pressure receiving surface is exposed to an outside through a wall of a bottom portion of the case and wherein the pressure receiving surface is not connected with the case mechanically; and a displacement sensor that senses the stress received from the bedrock and the strain of the bedrock based on a displacement amount of the pressure receiving surface of the another pressure receiving member.

\* \* \* \* \*